United States Patent
Eger

(10) Patent No.: US 9,675,091 B1
(45) Date of Patent: Jun. 13, 2017

(54) AUTOMATED MONITORING IN CUTTING UP SLAUGHTERED ANIMALS

(71) Applicant: Horst Eger, Ahrensfelde (DE)

(72) Inventor: Horst Eger, Ahrensfelde (DE)

(*) Notice: Subject to any disclaimer, the term of this patent is extended or adjusted under 35 U.S.C. 154(b) by 0 days.

(21) Appl. No.: 15/017,008

(22) Filed: Feb. 5, 2016

(51) Int. Cl.
| | | |
|---|---|---|
| *A22C 17/00* | (2006.01) | |
| *A22C 18/00* | (2006.01) | |
| *G06T 7/00* | (2017.01) | |
| *G06T 7/40* | (2017.01) | |
| *H04N 9/04* | (2006.01) | |
| *G06T 7/60* | (2017.01) | |

(52) U.S. Cl.
CPC ........ *A22C 17/0086* (2013.01); *A22C 17/004* (2013.01); *A22C 17/0093* (2013.01); *A22C 18/00* (2013.01); *G06T 7/0004* (2013.01); *G06T 7/408* (2013.01); *G06T 7/602* (2013.01); *H04N 9/04* (2013.01); *G06T 2207/10021* (2013.01); *G06T 2207/10024* (2013.01); *G06T 2207/30128* (2013.01)

(58) Field of Classification Search
CPC ... A22C 17/00; A22C 17/0006; A22C 17/002; A22C 17/0033; A22C 17/004; A22C 17/008
USPC ....... 452/125, 127, 130, 136, 149, 150, 135, 452/155, 160, 166, 170
See application file for complete search history.

(56) References Cited

U.S. PATENT DOCUMENTS

| | | | | |
|---|---|---|---|---|
| 5,944,598 A | * | 8/1999 | Tong | A22B 5/007 382/100 |
| 7,399,220 B2 | * | 7/2008 | Kriesel | A01K 11/008 452/157 |
| 8,292,702 B2 | * | 10/2012 | Bolte | A22C 17/12 452/134 |
| 8,758,099 B2 | * | 6/2014 | Reifenhaeuser | A22C 17/002 452/157 |
| 8,777,704 B2 | * | 7/2014 | Stooker | A22C 21/0076 452/135 |
| 8,862,262 B2 | * | 10/2014 | Thorsson | A22C 17/0093 452/150 |
| 8,981,897 B2 | * | 3/2015 | Alsafar | A22C 17/0006 219/121.58 |

(Continued)

*Primary Examiner* — Richard Price, Jr.
(74) *Attorney, Agent, or Firm* — Kriegsman & Kriegsman

(57) ABSTRACT

Method and system for the automatic monitoring of the process for the industrial cutting up and deboning of slaughtered animal bodies with respect to leaving the smallest fraction as possible of meat remaining behind on the bones extracted in the cutting process. For this purpose, images of segments that are detached during the cutting up of large pieces of the slaughtered animal body are recorded by an image recording device on at least one conveyor belt serving for transporting them away. Based on their different colors, images of these segments are differentiated from the conveyor belt, and bone, fat, and meat remaining on the bone of the images within the segments are also differentiated. By determining a quotient between a geometric quantity of the portions identified as meat for one or a plurality of segments and a geometric quantity of the same type determined overall for the same segment or the same segments, the fraction of meat in the separated segments is then determined. Finally, the result is visualized, for example, directly on a display, or/and is further processed for creating reports or for the output of warning signals.

20 Claims, 2 Drawing Sheets

(56) References Cited

U.S. PATENT DOCUMENTS 9,000,893 B2 * 4/2015 Kwak ................ G06K 19/0723
209/3.2

* cited by examiner

AUTOMATED MONITORING IN CUTTING UP SLAUGHTERED ANIMALS

FIELD OF THE INVENTION

The invention relates to a solution for monitoring the process of cutting up and deboning slaughtered animal bodies in cutting plants having preferably several cutting stations, wherein the cutting process is monitored with respect to leaving the smallest fraction possible of meat behind on the bone that is extracted during the cutting. The subjects of the invention are a corresponding method and a system suitable for conducting the method.

BACKGROUND OF THE INVENTION

The industrial production of meat takes place today in large plants in which animals bred and fattened for this purpose are slaughtered and cut up and deboned, whereby the extraction of bones from the meat is designated "deboning". For example, up to 6,000 cattle per day are slaughtered, cut up, and usually deboned in large cattle slaughterhouses in the USA. The slaughtered animal body is generally cut up and deboned in one or a plurality of so-named cutting lines that are each furnished with several cutting stations in corresponding large enterprises.

The slaughtered animal bodies are cut up in steps as they pass to the individual cutting stations, whereby, at the individual cutting stations, the bone or bones are also extracted from the large animal piece that is processed at the station. Here, an operator working at the respective cutting station detaches the segments containing bones from the large piece of the slaughtered animal body that he processes either by means of a knife or with the assistance of power tools. These segments which are detached from the respective large animal piece and which are composed of bone and meat remaining thereon, are then usually transported away via one or more conveyor belts.

With respect to the commercial value of the meat, attempts have been made to leave as little meat as possible on the extracted bones; therefore, the segments detached from the large pieces of the slaughtered animal body have as little meat as possible and thus are composed almost only of bone. The remains of residual meat on the bones in connection with this is one of the largest reserves of the commercial meat industry. It happens not rarely that up to 500 g of meat remain on large beef bones, for example. For meat producers, depending on the large piece of the slaughtered animal body that is involved, this can mean a loss of 1 to 2 dollars. For this reason, it is important to monitor the cutting up of meat so as to be as careful as possible. According to the prior art, this is done on the basis of visual inspection of random samples by personnel who are particularly trained for this task.

In practice, however, visual inspection by random sampling has frequently been proven to have many gaps. In any case, it is not suitable for achieving a comprehensive and accurate overview of the quality of cutting in a very large slaughterhouse, i.e., particularly for deboning, with respect to the quantity of meat remaining on the bones during the processing of the slaughtered animal body. The accuracy is also negatively influenced by subjective factors, both of the person and the mood of the persons conducting the inspection.

Presentation of the Invention

An automated method for objectivizing the monitoring of the process of cutting up and deboning slaughtered animal bodies, and for increasing the accuracy of the monitoring result is proposed. The method proceeds here from a cutting process usually encountered in large cutting plants, according to which, the slaughtered animal body is cut up step by step in preferably several cutting stations; the segments that contain bones are separated or detached from these large animal pieces for the extraction of bones; and the respective segments separated or detached from the large animal pieces are transported away via one or a plurality of conveyor belts.

The cutting process is monitored in an automated way according to the invention to obtain as small a fraction as possible of the meat remaining on the extracted bones, i.e., essentially by the following steps that roughly describe the process.

a) On at least one conveyor belt, images of segments that are composed of bone, fat, and meat remaining on the bone and that have been detached from the large pieces of the slaughtered animal body are recorded by means of an image recording device. Preferably for recording of the segments a camera apparatus with at least one color camera is used. Basically it also would be possible to use means of computer tomography or of nuclear spin tomography for recording images of the detached segments containing bones. But in view of the costs this would be rather unrealistic at present.

b) The fraction of meat on the images of segments recorded by means of the image recording device, i.e., the fraction of the meat remaining on the bones in a way that is not wanted, is determined by means of image-processing software. For this purpose, first the segments are differentiated from the conveyor belt by color and then the meat is distinguished from the other compartments of the segments, i.e., bone and fat. Finally, by determining a quotient between a geometric quantity of the portions identified here as meat for one or more segments and a geometric quantity of the same type determined overall for the same segment or the same segments, the fraction of meat on the separated segments is determined.

c) The data determined for the meat fraction of the detached segments, i.e., the data for the fraction of meat remaining on the bones in the detaching of segments with bones from the large pieces of the slaughtered animal body, are either visualized directly on means designed for this purpose, such as displays, for example, or/and further processed by at least one computer-based apparatus. More precise information shall be given later with respect to the last of the two above-named alternatives for employing the data on the meat fraction remaining on the bone, which has been determined. Here, it shall only be indicated that the computer-based apparatus that optionally further processes the data preferably involves the same processing apparatus by means of which the software for image processing and for determining the fraction of meat remaining on bones of detached segments (meat fraction of the segments) is executed by determining a quotient from the geometric components named under b).

As far as the geometric quantity or the geometric type mentioned previously in connection with step b) is concerned, in the practical implementation of the method, starting from the basic procedure, different embodiments of the invention come into consideration. Which of these possible embodiments is to be given preference here depends on the desires of the particular customer, i.e., on the requirements of a particular slaughterhouse using the method.

According to a first embodiment, the geometric quantity in question or its type may involve a surface area. A second possibility is given by the fact that the previously mentioned determining of a quotient can occur based on volumes between corresponding volumes for the regions determined to be meat on the basis of their color and the respective volume of the segments overall.

Insofar as the determining of a quotient for finding the meat fraction is based on surface areas, i.e., on the one hand, the sum of the surface areas of one or more segments detached from large pieces of the slaughtered animal body being identified as meat, and, on the other hand, the total surface area of the same one or more detached or extracted segments, the surface areas in question can be determined from two-dimensional images of the segments that have been detached from large pieces of the slaughtered animal body that have been transported by means of the at least one conveyor belt. Corresponding individual image recordings or video recordings for determining a quotient referred to the surface area can be provided by a camera apparatus having only one color camera.

A quotient relative to volume can be determined on the basis of three-dimensional image recordings, which are prepared from the extracted segments with the use of a camera apparatus equipped with a plurality of cameras that record the segments from different angles. An alternative possibility for obtaining volume-based information consists in recording two-dimensional camera images from the segments with the use of the light-sectioning method, in which parallel, straight light stripes are projected onto the segments and volume information is obtained from the curvature of the stripes on the surface of the segments.

Which of the above-named embodiments of the method—surface area-based or volume-based determining of the quotient—is to be implemented in practice in each case depends on the accuracy requirements posited, and is limited by the equipment of the camera apparatus provided with respect to these requirements. In this context, the camera apparatus is understood to be an apparatus with one or a plurality of cameras having additional, supplementary, optional equipment, if needed, such as lighting equipment in particular. More precise embodiments shall be provided therefor in connection with the presentation of the system according to the invention.

Also, various possibilities exist with respect to the image recording of segments detached from the large animal pieces and containing single or several bones and relative to evaluating the images produced based on this with the subsequent determination of the quotient. These possibilities are provided for individual segments of this type for a possible embodiment of the method according to the invention. Accordingly, for each individually recorded segment detached from a large animal piece of a slaughtered animal body, meat and bone are differentiated by means of the image-processing software, and the fraction of the meat remaining on the bone or bones of the respective segment is found by way of determining the quotient as explained above. With respect to providing the result in the form of a report, some other type of information, or in the form of a signal—more detailed information relating to the latter shall be given later—this case, preferably a mean value is determined for several meat fractions determined in this way for detached segments transported by means of the same conveyor belt.

Another possibility consists in recording images of several segments detached from large animal pieces and transported by means of the conveyor belt over an established time interval, conducting an image evaluation of these in the sense of distinguishing between meat and bone (and fat), and performing the described quotient determination for all of the segments and their components recorded within the time interval. This also basically corresponds to determining a mean value. An interval of 5 to 10 minutes could be viewed as appropriate for the above-named time interval.

Independent of whether the respective meat fraction of the segments detached from large pieces of the slaughtered animal body for extraction of bones is determined on the basis of an evaluation of images of individual detached segments or of a group of segments, is the question of how the actual image recording or image acquisition is accomplished. There is the possibility of a continuous, clocked recording of individual images at an interval of a few milliseconds. Conducting the sequential recording of individual images not at constant time intervals, but rather controlling such recording or image acquisition by means of a trigger is also possible and may be preferred. A possibility that is particularly to be preferred consists in using an encoder signal provided by an incremental measuring-wheel encoder of the conveyor belt. In this case, the image recording is triggered as a function of the running speed of the conveyor belt and thus as a function of the speed of transport of the separated or detached segments from large pieces of the slaughtered animal body that are to have their images recorded. This has the advantage that, for example, because of resting phases, such as may occur due to pauses in work or disruptions of the conveyor belt (for example, interference of the conveyor belt), the desired result, i.e., to obtain information that is as precise as possible on the fraction of meat remaining on the bones is not adversely affected or falsified.

Moreover, it would be conceivable to record video sequences of the segments detached from large pieces of processed, slaughtered animal bodies transported by means of the conveyor belt, and to extract individual images therefrom by means of a frame grabber controlled by markings on the belt.

With respect to the evaluation of the detached segments by means of the information on the meat fraction, which is obtained by means of the above-described steps, the method according to the invention also comprises various possibilities. The latter refer to both the reporting of the results as well as to the possibilities for a direct intervention in the deboning process, which is also automated if need be, depending on the implementation. In that regard, thus with respect to the question of how the results obtained for the meat fraction in the segments should be handled, the method can be aligned flexibly in its implementation to the wants and needs of the customer. Here, a reporting of the results, for example, in the form of storing a time curve for the meat fractions determined in each case, is conceivable, with the objective of enabling possibilities for inspectors or persons responsible for the production to influence the process on the basis of certain statistical information or based on the cutting and deboning carried out by employees. Another conceivable option consists in establishing threshold values for the meat fraction of the detached segments, thus the quantity or the fraction of meat remaining on the bones, and if these threshold values are exceeded, at least an optical and/or acoustic warning signal is emitted. In continuation of the last-named possibility, which is based on providing the results determined for the meat fractions for computer-based further processing, there is the additional possibility that segments with a meat fraction that remains too high for a post-processing are automatically removed from the processing line or from the normal processing procedure by means of corresponding actuators disposed in the processing line.

A system suitable for conducting the method is composed of at least one conveyor belt for transporting away segments containing bones, which have been detached from large pieces of the cut-up slaughtered animal body; a camera apparatus with at least one color camera; and a processing apparatus, which is equipped with image-processing software as well as with software by means of which, based on a color differentiation between bone, fat and meat, images of segments recorded by means of the camera apparatus as well as a quotient determination of geometric quantities of the recognized compartments of the segments provide digital information describing the meat fraction of the detached segments for direct output or for further processing by means of computer-based equipment.

Depending on whether the surface area-based variant or a volume-based variant of the method according to the invention is implemented, the camera apparatus of the system can comprise one or more color cameras or also, however, can be designed in the form of at least one camera equipped with an apparatus for laser triangulation or a light projector for application of the light-sectioning principle. Independent of the question of determining the fraction of the meat remaining on the bones based on surface area or volume, a component of the camera apparatus is preferably a suitable lighting device for illumination of the regions whose images are recorded by the one or more cameras.

Insofar as one speaks of at least one conveyor belt that is equipped with a camera apparatus for image recording of segments detached from large animal pieces, both in connection with presenting the method as well as presenting the system, it can be recognized that different possibilities are also given in this respect for the practical implementation of the invention. Which of these possibilities is selected in each case depends in turn on the particular circumstances of the slaughterhouse employing the invention and the desires of the operator. Thus, it is conceivable that a corresponding monitoring is provided for only one of optionally several cutting stations, from which bone-containing segments of a specific large piece of a slaughtered animal body is transported away by a conveyor belt. On the other hand, insofar as a corresponding monitoring is provided for several cutting stations, this can be provided, on the one hand, by equipping the particular conveyor belts of the individual cutting stations with the camera apparatus provided according to the invention, i.e., providing a plurality of conveyor belts. On the other hand, however, it is also possible to equip only one conveyor belt (the collecting conveyor belt) with such a camera apparatus, the collecting conveyor belt being the one where the conveyor belts of the individual cutting stations are brought together. Here, it is also conceivable to provide measures that make it possible finally to assign the segments of the large pieces of the slaughtered animal bodies transported away by the collecting conveyor belt to individual cutting stations. In the case of an image recording of individual conveyor belts, the image processing as well as the final determination of the meat fraction by determining the quotient can be provided in turn as desired in a decentralized manner by processing equipment provided on the individual conveyor belts or at a central site.

Both aspects of the invention relating to the method as well as to the system shall be explained once more below on the basis of an exemplary embodiment for the system.

DETAILED DESCRIPTION OF THE DRAWINGS

Figure 1:
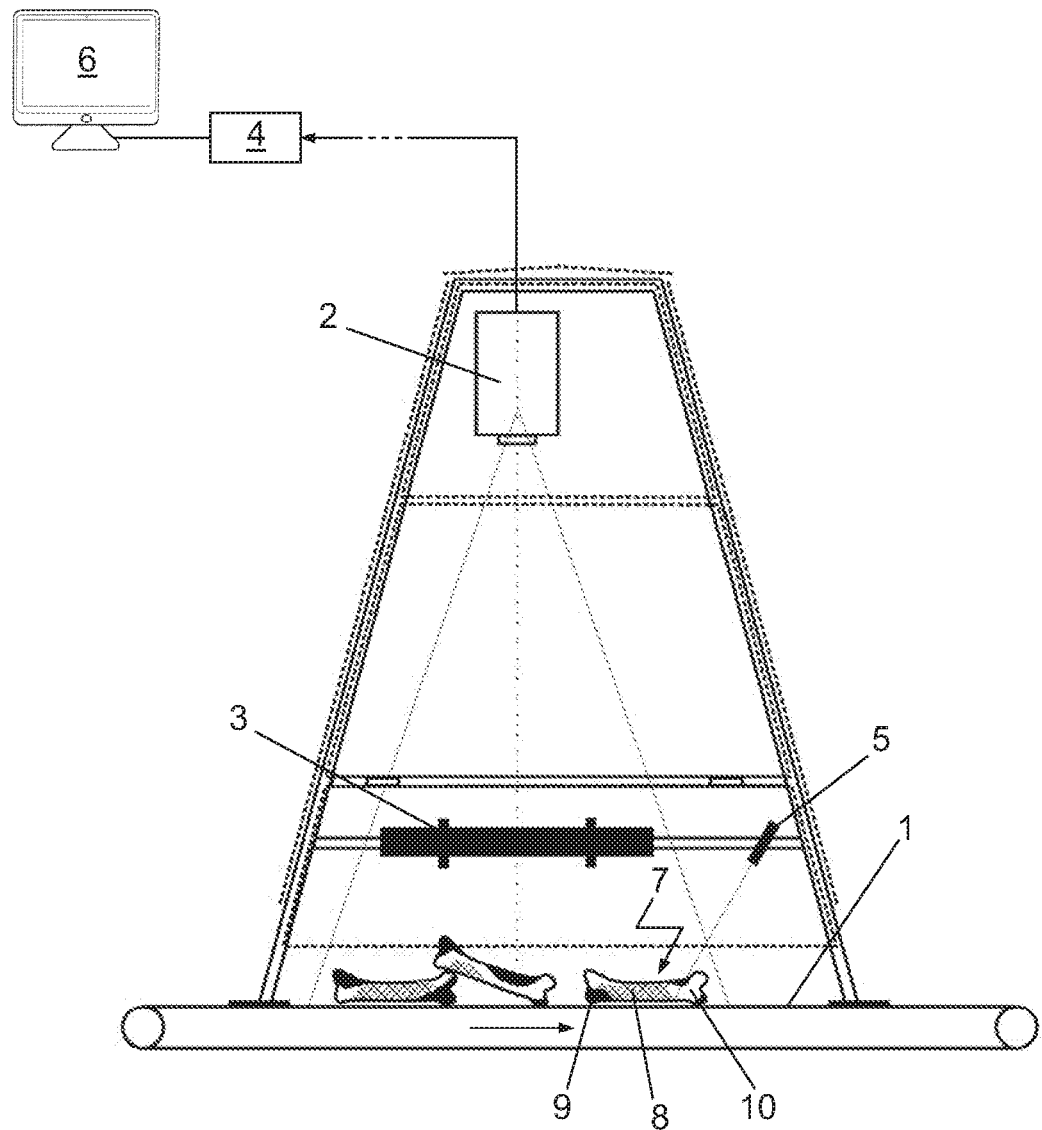
FIG. 1 shows a possible embodiment of the system in a lateral view.

FIG. 1 shows a possible embodiment of the system according to the invention in a very greatly simplified and schematized representation. The figure shows the system in a lateral view. The system is essentially composed of a conveyor belt 1 with a coloring deviating from the color of both bones 8 and fat 10 as well as from meat 9 of slaughtered animal bodies; a camera apparatus 2, 3 for recording images of segments 7 detached from larges pieces of the slaughtered animal body and transported by means of the conveyor belt 1; and a processing apparatus 4. The direction of movement of the conveyor belt is characterized by the arrow.

The following procedure is executed with the use of the system that is shown. First, images of one or more of the segments 7 transported by the conveyor belt 1 is or are recorded by means of the camera apparatus 2, 3 composed here of a camera 2 and a lighting device 3. The one or more recorded images are input into an image-processing software program and processed by the processing apparatus 4. By means of this software program, a distinction is made for each image pixel on the image matrix of a recorded image of whether it belongs to a portion of the conveyor belt 1 or to a portion of a detached segment 7 transported by the latter. This is successful because the surface of the conveyor belt 1, as already mentioned, has a color that is different from both bones 8 and fat 10 as well as from meat 9 of the slaughtered animal body. In a subsequent processing step, the differentiation of the image pixels recognized as belonging to a detached segment 7 then follows with respect to whether these pixels belong to meat 9, fat 10 or bones 8. This differentiation is produced on the basis of the red fraction of the image pixels, whereby a high red fraction (a corresponding limiting value therefor is filed in the system) identifies an image pixel as belonging to meat 9 remaining on the bone 8. In the figure, the actual bones 8, thus the surface regions of the bones 8 that are free of fat 10 and meat 9 are shown by hatch marks. The regions shown as solid black symbolize the meat 9 remaining on the bones 8 and the white regions symbolize the fat 10.

Finally, in the last step, a quotient is determined by means of the software designed for this purpose, in which the geometric quantity of the image pixels recognized as belonging to meat 9 is divided by the geometric quantity of the image pixels recognized as bones 8, fat 10 and meat 9 for the detached segment 7. As long as the camera apparatus 2, 3 is equipped in such a way that images of the detached segments 7 transported by means of the conveyor belt 1 are recorded only from one direction (such as here, for example, with only one camera 2), the image pixels classified in the way described above are summed up, proceeding from the size of the image pixel, on the one hand, relative to a surface corresponding in its entirety to the segment 7, and, on the other hand, to a surface corresponding to the fraction of the meat 9 remaining on the bone or bones 8.

More accurate results are obtained, in contrast, if the image recording of the transported detached segments 7 are produced with the help of a plurality of cameras from different directions, or, as in the example shown, the camera 2 is equipped with an apparatus 5 for laser triangulation, which makes possible 3-dimensional information. In the last-named case, accordingly, the quotient is determined on the basis of volumes that correspond, on the one hand, to the total volume of a recorded image of segment 7, and, on the other hand, to the sum of the volumes for the fraction of meat 9 remaining on the one or more bones 8.

Another alternative, which deviates from the example shown, for obtaining volumetric information with the use of only one camera 2, consists in employing the light-sectioning method. For this purpose, parallel straight light stripes are projected onto the segments 7 passing by the camera, and these stripes become curved in a different way on the surfaces of segments 7 based on their 3-dimensional structure. It can then be determined from the recording of the corresponding curvatures by means of camera 2 how far individual regions project out from the plane of the recorded two-dimensional illustration of segments 7, and thus the volume of the detached or extracted segments 7 of bones 8 with meat 9 and fat 10 as well as the volume of the individual components thereof can be determined or approximately extrapolated.

As has already been mentioned, the image acquisition can be produced in clocked manner or can be triggered by an encoder signal that is generated by corresponding means (not shown here) provided on the conveyor belt 1, namely at least one incremental measuring-wheel encoder. By means of this encoder signal, the camera apparatus 2, 3 in this case can be triggered, for example, so that the image recording will be started or stopped synchronously with the at least one conveyor belt transporting detached segments and monitored by the camera apparatus 2, 3.

The results obtained pertaining to the meat fraction remaining on the bones 8, in each case depending on the configuration of the system, i.e., in particular its processing apparatus 4 and the software employed by the latter, according to the wishes of the customer, are stored in the form of reports reproducing statistical curves or are output directly to a visual display unit (display or monitor 6) that is suitable for this purpose, or however, they are further processed in order to examine a possible exceeding of a threshold value for the meat fraction. In the last-named case, if the fraction of meat 9 remaining on the bones 8 exceeds a corresponding threshold value, the processing apparatus 4 causes the output of at least an optical and/or acoustical signal or corresponding information. As already mentioned earlier, the system, however, in the last-named case, can also be enhanced in such a way that, for the output of optical and/or acoustic warning signals, the processing apparatus 4 alternatively or additionally excludes segments 7 having a remaining meat fraction that is too high from the processing line by acting on corresponding actuators (not shown here) disposed in the transport path of the conveyor belt 1.

Figure 2:
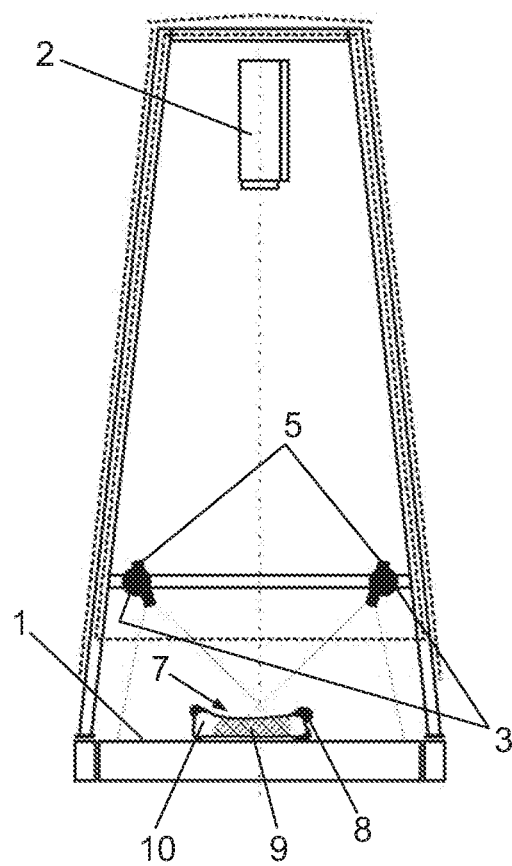
FIG. 2 shows the embodiment according to FIG. 1 once more in a view from the direction of motion of the conveyor belt.

FIG. 2 shows the embodiment of the system according to the invention, which has been explained above on the basis of FIG. 1, in yet another view, wherein, in this figure, the symbolic presentation of the processing unit and the monitor for the output of information relative to the quality of the cutting process with respect to the fraction of meat remaining on the large pieces of the slaughtered animal body during deboning were omitted. The figure shows the conveyor belt 1, the camera apparatus 2, 3 having the camera 2 and the lighting device 3, the apparatus 5 for the laser triangulation, as well as a segment 7 with bone 8, meat 9, and fat 10 from the direction of transport of conveyor belt 1, this segment having been detached from a large piece of a slaughtered animal body and transported on the conveyor belt 1.

The invention claimed is:

1. A method for monitoring the process of cutting up and deboning slaughtered animal bodies in cutting plants, within which the slaughtered animal body is divided up in steps for extracting the bones from the large animal pieces that arise; segments with bones contained therein are detached from the large animal pieces, and the detached segments composed of bones with meat remaining thereon are transported off via one or more conveyor belts, wherein the cutting-up process is monitored with respect to leaving the smallest fraction possible of meat behind on the bones extracted during cutting, is hereby characterized in that the monitoring is executed automatically by
   a) recording images of detached segments containing bones on at least one conveyor belt,
   b) differentiating bone, fat and meat of the imaged segments based on their different color by an image-processing software program, and determining a meat fraction of the detached segments, that is a fraction of meat remaining on the bone or bones in the detaching of the segments as a quotient between a geometric quantity of the portions identified as meat for one or more segments and a same type geometric quantity determined overall for said segment or segments,
   c) directly visualizing data as determined according to b) on means for directly visualizing data or/and further processing data as determined according to b) for output of messages derived therefrom, or for creation of reports to be output later.

2. The method according to claim 1, further characterized in that for recording of images of the detached segments containing bones a camera apparatus with at least one color camera is used.

3. The method according to claim 1, further characterized in that two-dimensional images of segments containing bone are recorded on the at least one conveyor belt and in that surface areas determined by image processing, namely, sums of surface areas identified as meat for one or a plurality of extracted segments and of total surface area of said extracted segment or segments, are used as geometric quantities for a quotient for determining a meat fraction of detached segments.

4. The method according to claim 1, further characterized in that volumes determined in the image processing, namely, sums of volumes identified as meat for one or a plurality of extracted segments and of total volume of said extracted segment or segments, are used as geometric quantities for a quotient for determining a meat fraction of detached segments.

5. The method according to claim 4, further characterized in that the volumes used for the quotient for determining the meat fraction of the detached segments are determined on the basis of two-dimensional images, which are recorded by a camera apparatus on the at least one conveyor belt, from segments containing bones and from parallel light stripes projected on these segments.

6. The method according to claim 4, further characterized in that the volumes used for the quotient for determining the meat fraction of the detached segments are determined on the basis of three-dimensional images of segments containing bone recorded by a plurality of cameras on the at least one conveyor belt.

7. The method according to claim 1, further characterized in that the image recording and a subsequent determination of the meat fraction of the detached segments are carried out by image processing and determining a quotient, in each case for an individual segment containing bone that has been detached from a large piece of the slaughtered animal body.

8. The method according to claim 7, further characterized in that a mean value is found for quotients determined for individual detached segments, before data for the meat fraction of the detached segments are visualized or/and further processed for deriving messages or for creating reports.

9. The method according to claim 7, further characterized in that images of the at least one conveyor belt and the segments detached from large pieces of the slaughtered animal body and transported away by the at least one conveyor belt are recorded as individual images under control by a trigger signal.

10. The method according to claim 9, further characterized in that the trigger signal is generated by at least one measuring-wheel encoder of the at least one conveyor belt equipped with the camera apparatus.

11. The method according to claim 7, further characterized in that a threshold value is filed in a processing unit that executes software determining the quotient for the meat fraction of the detached segments, and if this threshold value is exceeded, the segment involved that has too high a remaining meat fraction and that has been detached from an animal piece of a slaughtered animal body is removed from the processing procedure for post-processing.

12. The method according to claim 1, further characterized in that images of segments detached from large pieces of the slaughtered animal body are recorded over an established time interval and then the images are processed by software for the images recorded in the time interval, including determining the quotient for obtaining the data to be visualized or/and to be further processed for the meat fraction of the detached segments.

13. The method according to claim 1, further characterized in that images of the at least one conveyor belt and the segments detached from large pieces of the slaughtered animal body and transported away by the at least one conveyor belt are continuously recorded in a clocked manner as individual images.

14. The method according to claim 1, further characterized in that images of the at least one conveyor belt and the segments detached from large pieces of the slaughtered animal body and transported away by the at least one conveyor belt are recorded as a video sequence and individual images are taken by means of a frame grabber.

15. The method according to claim 1, further characterized in that a threshold value is filed in a processing unit that executes software determining the quotient for the meat fraction of the detached segments, that is a fraction of meat remaining on the bone, and if this threshold value is exceeded, an optical or/and an acoustic warning message will be output.

16. A system for the automatic monitoring of the process of cutting up and deboning of slaughtered animal bodies with respect to the fraction of meat remaining on the bones extracted in the cutting-up process on at least one conveyor belt for transporting away the segments composed of bones with meat remaining thereon that have been detached from large pieces of the slaughtered animal body, is hereby characterized in that the at least one conveyor belt has a color different from meat, fat and bone, and in that the system comprises a camera apparatus disposed on the at least one conveyor belt, this camera apparatus having at least one color camera for the image recording of the conveyor belt as well as segments detached from animal pieces transported on this belt; and a processing unit with a software program which, in its execution by the processing apparatus, based on a color differentiation of image regions of the images recorded by the camera apparatus and on a determination of the surface areas or volumes of the segments recognized in the images based on this differentiation and of the meat recognized in image regions of the same images, determines data for the meat fraction of the segments detached from large pieces of slaughtered animal bodies, namely for the fraction of meat remaining on bones of segments transported by the at least one conveyor belt; and these data are visualized directly on means for visualizing data or/and further processed for the output of messages derived therefrom or for the creation of reports to be output later.

17. The system according to claim 16, further characterized in that, for application of a light-sectioning method, in addition to the one color camera, the camera apparatus of the system comprises a projection apparatus for the projection of equidistant light stripes onto the at least one conveyor belt and onto the segments detached from large pieces of slaughtered animal bodies and transported by the belt.

18. The system according to claim 16, further characterized in that the camera apparatus of the system comprises a plurality of color cameras for the recording of three-dimensional images of segments detached from large pieces of slaughtered animal bodies and transported by the at least one conveyor belt.

19. The system according to claim 16, further characterized in that the camera apparatus of the system comprises at least one color camera for the recording of video sequences.

20. The system according to claim 16, further characterized in that the at least one conveyor belt equipped with the camera apparatus has at least one incremental measuring-wheel encoder triggering the camera apparatus.

* * * * *